United States Patent [19]

Stewart et al.

[11] Patent Number: 5,215,581

[45] Date of Patent: Jun. 1, 1993

[54] COMPOSITION AND USE

[75] Inventors: David Stewart, Royton; Robert S. Whitehouse, Edenfield, both of England

[73] Assignee: Imperial Chemical Industries PLC, United Kingdom

[21] Appl. No.: 731,687

[22] Filed: Jul. 17, 1991

[30] Foreign Application Priority Data

Jul. 20, 1990 [GB] United Kingdom ............... 9016027

[51] Int. Cl.$^5$ .............................................. C09C 1/02
[52] U.S. Cl. ............................... 106/471; 106/287.23; 106/287.24; 106/287.25; 106/287.26; 106/400; 106/401; 106/461; 106/491; 106/499; 106/15.05; 106/18.11; 106/18.21; 106/18.26
[58] Field of Search .................... 106/287.23, 287.24, 106/287.25, 287.26, 499, 491, 400, 401, 461, 471, 15.05, 18.11, 18.21, 18.26; 528/219

[56] References Cited

U.S. PATENT DOCUMENTS

| | | | |
|---|---|---|---|
| 3,879,347 | 4/1975 | Serini et al. | 528/196 |
| 3,879,348 | 4/1975 | Serini et al. | 528/125 |
| 4,374,888 | 2/1983 | Bornslaeger | 428/198 |
| 4,491,649 | 1/1985 | Falk et al. | 525/92 |

FOREIGN PATENT DOCUMENTS

| | | |
|---|---|---|
| 0048344 | 3/1982 | European Pat. Off. |
| 400773 | 5/1990 | European Pat. Off. |

Primary Examiner—Mark L. Bell
Assistant Examiner—Scott L. Hertzog
Attorney, Agent, or Firm—William E. Dickheiser; Paul L. Sharer

[57] ABSTRACT

A particulate inorganic solid, especially hydrated alumina or magnesium hydroxide, which has been treated with a hydroxybenzene derivative of a defined type, particularly a gallate. The treated solid may be incorporated into a polymer especially a thermoplastic polymer such as polypropylene. Alternatively, the solid, the hydroxybenzene derivative and the polymer can be blended together. The composition obtained can be processed even when containing 70% by weight of the inorganic solid.

14 Claims, No Drawings

COMPOSITION AND USE

The present invention relates to inorganic solids and to polymer compositions, particularly olefin polymer compositions which contain such inorganic solids.

In recent years there has been increasing interest in polymer compositions containing a high proportion, for example at least 30% by weight, of an inorganic solid. Depending on the inorganic solid used, the composition may be used as an insulator, or outer sheath, for electric conductors; or as a sound deadening material; or in an application in which improved mechanical properties are desired. The presence of high levels of an inorganic solid reduces the processibility of the composition, and this is undesirable if the composition is to be used in an injection moulding or extrusion process. The processibility can be improved by using higher processing temperatures but this can cause problems with compositions containing flame retardant additives or free radical generators such as peroxides. Processibility can be improved by the use of processing aids. However, with low levels of processing aid the improvement achieved is not entirely satisfactory whereas with higher levels of processing aid the mechanical properties of the composition, for example the flexural and impact properties, are adversely affected. Furthermore, the processing aid is generally more flammable than the inorganic solid and hence higher levels of the processing aid are particularly undesirable in compositions intended to possess fire retardant characteristics. It is therefore desirable to provide a polymer composition having a high level of an inorganic solid, that is at least 30% by weight, and having an improved processibility. This is particularly desirable if the inorganic solid is a material such as hydrated alumina which is used to provide fire retardancy and is desirably present in the polymer composition at a level of at least 50% by weight and especially about 70% by weight.

According to the present invention there is provided a composition comprising a particulate inorganic solid and 0.1 up to 20% by weight, relative to the particulate inorganic solid, of an aromatic hydroxy compound of the general formula (I) or of general formula (II) or of general formula (III):

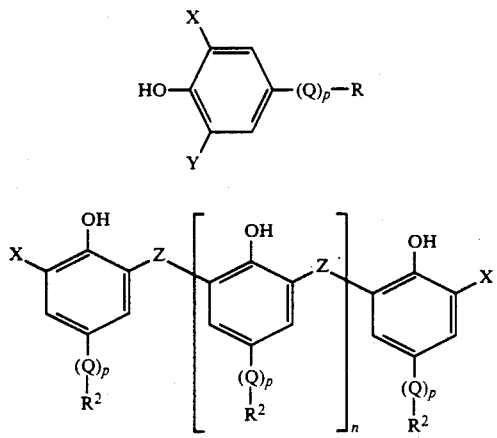

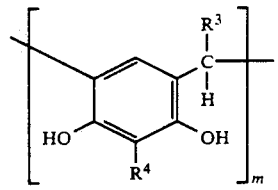

wherein
X is a group OH, $CR^1O$, $CR^1=NOH$ or AOH;
Y is a hydrogen atom or is as defined for the group X;
Q is —O—, —CO—, —CO.O— or O.CO—;
p is zero or 1;
R is a saturated hydrocarbon which contains at least eight carbon atoms or an unsaturated hydrocarbon which contains at least three carbon atoms and the hydrocarbon moiety may be substituted;
$R^1$ is a hydrogen atom, or a hydrocarbon group or a substituted hydrocarbon group;
$R^2$ is hydrogen when p is zero or a hydrocarbon group or a substituted hydrocarbon group;
$R^3$ is a hydrocarbyl group or a substituted hydrocarbyl group which contains from 1 up to 24 carbon atoms;
$R^4$ is hydrogen or a hydroxy group;
A is a divalent linking group which is a hydrocarbon or substituted hydrocarbon group;
Z is a direct bond or a divalent linking group; and
m is an integer; and
n is zero or has a positive integer value.

In compounds of the general formula (I), the group X is typically OH, $CR^1O$ or $CR^1=NOH$, especially OH or $CR^1=NOH$ and particularly OH. The group Y is typically either hydrogen, an OH group or a group $CR^1=NOH$ and preferably when Y is OH group, the group X is also an OH group and when Y is $CR^1=NOH$, the group X is also $CR^1=NOH$.

If the group $R^1$ is a hydrocarbon group it may be an alkyl, aryl, alkaryl or aralkyl group. If the group $R^1$ is a hydrocarbon group it is typically a lower alkyl group containing 1–4 carbon atoms such as a methyl group, a mono aryl group such as a phenyl group or an alkaryl group containing 1–4 aliphatic carbon atoms such as a benzyl group. Conveniently the group $R^1$ is a hydrogen and the compounds of formula (I) and formula (II) are aldehyde or aldoxime derivatives.

The group R preferably contains at least eight carbon atoms. For reasons of availability, the group R preferably does not contain more than 30 carbon atoms, more preferably not more than 24 carbon atoms and especially not more than 20 carbon atoms. The group R may be acyclic or cylic or a mixture thereof, for example alkyl, cycloalkyl, aryl, alkaryl and aralkyl. Typically the group R is an acyclic group, for example an alkyl or alkenyl group. If the group R is unsaturated it is preferably an acyclic group containing one or more unsaturated bonds, such as allyl, decenyl, heptadecenyl, octadecenyl, penta-1,3-dienyl, hexa-2,4-dienyl, heptadeca-8,11-dienyl or octadeca-9,12-dienyl. Conveniently, the group R is a mixture of groups, and may be a mixture of isomers, such as isomeric branched alkyl groups, or a mixture of groups containing different numbers of carbon atoms, or a mixture of both types, that is different isomers and groups containing different numbers of carbon atoms. The group R is typically an alkyl or alkenyl group or mixture of different alkyl groups. Typical examples of R are tetradecyl, octadecyl, mixed branched chain nonyl, mixed branched chain dodecyl, allyloxycarbonyl, octyloxycarbonyl, dodecyloxycarbonyl and octadecyloxycarbonyl.

When Y is a hydrogen atom the group p is preferably zero. When X and Y are both an OH group, p is preferably 1 and Q is preferably CO.O so that the compound of formula (I) is an ester of gallic acid.

Where the group X is a group —AOH, the group A is typically a lower alkylene group containing from 1 to 4 carbon atoms, for example, a methylene or ethylene group so that the group —AOH is hydroxymethyl or hydroxyethyl. This is a preferred definition of X in the compounds of formula (II).

The group $R^2$ can be hydrogen but is preferably other than hydrogen, and is especially a hydrocarbon group, for example, one which contains at least four carbon atoms and preferably not more than 20 carbon atoms. Examples of $R^2$ are typically the same as for the group R when R is hydrocarbon. It is especially preferred that each $R^2$ is alkyl or alkenyl which may be linear or branched.

If the group Z is other than a direct bond it is preferably a divalent hydrocarbon or substituted hydrocarbon group or a —CO— or —$SO_2$— group. Typically the group Z is a divalent hydrocarbon group, conveniently one containing notmore than six carbon atoms such as a methylene group or a methylene group substituted with one or two hydrocarbon groups as in the group dimethylmethylene (—$C(CH_3)_2$—).

When the value of n is zero the compound of formula (II) is a bis(phenol) derivative, such as a derivative of 2,2'-hydroxybiphenyl, bis(2-hydroxyphenyl)methane or 2,2-bis(2-hydroxyphenyl)propane. Where n has a positive value, the composition may contain a mixture of compounds of general formula (II) in which the values of n are different so that the mean value of n may not be an integer. In such a mixture, the values of n may be up to ten but generally are one, two and three, with minor proportions of compounds in which the values of n are four and five. Typically the mean value of n does not exceed four and in general is from one to three.

If any of the groups R, $R^1$ and $R^2$ is substituted, the substituent may be one or more of halogen, amine, hydroxy, hydrocarbonoxy, hydrocarboncarbonyl, hydrocarbonoxycarbonyl, hydrocarboncarbonyloxy, nitro, nitrile or carboxyl, and may be a mixture of such substituents such as in a hydroxyalkylamine group. Halogen is typically fluorine, chlorine and bromine and halosubstituted hydrocarbon includes trichloromethyl and trifluoromethyl. In general the groups R, $R^1$ and $R^2$ are unsubstituted.

In the compounds of formula (III), the group $R^3$ may be, or may include, an aryl group but it is preferred that $R^3$ is, or contains, an alkyl group. The group $R^3$ may be unsaturated, such as alkenyl or alkynyl and may contain more than one unsaturated bond. The group $R^3$ may be substituted typically by hydrocarboxy, acyl, acyloxy (that is an ester group), halogen (for example as in a trifluoromethyl group) or nitrile groups. It is preferred, however, that $R^3$ is an unsubstituted alkyl group. The group $R^3$ preferably contains at least 4, and especially at least 6, alkyl carbon atoms. Typically, the group $R^3$ contains not more than 20 carbon atoms, and especially not more than 14 carbon atoms. Compounds in which the group $R^3$ contains at least 7 carbon atoms have particularly useful properties.

The value of m is preferably between 3 and 5 and is especially four.

The preparation of the compounds of the formula (III) is disclosed in the published European Patent Application EP 0400773. Typically, the —OH groups on the benzene rings are all orientated in the same direction and lie on the same side of the molecule.

However, as is discussed in more detail hereafter, the composition may be incorporated into a polymeric material and the groups R, $R^1$, $R^2$ and $R^3$, particualrly the groups R, $R^2$ or $R^3$, may be substituted with the groups which give improved compatibility with the polymeric material.

It will be readily appreciated that the composition of the present invention may contain a mixture of the compounds of formula (I), formula (II) and/or formula (III).

A wide range of particulate inorganic solids may be used depending on the intended use of the composition and, if desired, a mixture of particulate inorganic solids may be used. The particulate inorganic solid is suitably a basic filler for example an oxide, a hydrated oxide, a hydroxide, a carbonate or a mixture thereof, and especially is predominantly an oxide, a hydrated oxide, a hydroxide or carbonate of a metal of Group II or III of the Periodic Table, such as magnesium, calcium or aluminium or a mixture thereof. The particulate inorganic solid is typically a material of the type which is used as an intumescent filler for a plastic material. The inorganic solid may be magnesium hydroxide, hydrated alumina, aluminium hydroxide, a hydroxycarbonate such as hydrated magnesium hydroxy carbonate which occurs naturally as hydromagnesite, a mixed carbonate such as magnesiumcalcium carbonate or may be a mixture of two or more such materials, for example a naturally occurring mixture of huntite and hydromagnesite which is available from Microfine Minerals Limited as "Ultracarb".

As a preferred composition in accordance with the present invention, the particulate inorganic solid is one or more halogen-free compounds which provide fire retardant and/or smoke suppressant characteristics to a polymer composition. In the preferred composition the particulate inorganic solid is both a fire retardant component and a smoke suppressant component. It is particularly preferred that the particulate inorganic solids are halogen-free, or contain only a small proportion, preferably less than 10% by weight of the total composition, of halogen-containing compounds. The fire retardant component is preferably a compound which liberates water on heating, for example the material referred to as hydrated alumina which may also be regarded as a form of aluminium hydroxide or a compound which liberates water at a temperature of at least 260° C., for example magnesium hydroxide (alternatively referred to as hydrated magnesia). The fire retardant component may be used in an admixture with other materials, for example precipitated calcium carbonate. The proportion of the fire retardant component is preferably in the range from 70 up to 100% by weight of the total particulate inorganic solid and the proportion of any other component is preferably in the range from 0 up to 30% by weight of the total particulate inorganic solid.

The preferred compositions in accordance with the present invention are those in which the particulate inorganic solid is a fire retardant material which liberates water on heating and the aromatic hydroxy compound is a compound of general formula (I) in which either X is a group OH or CH=NOH, Y is a hydrogen atom and R is a saturated alkyl group or X and Y are both OH groups and R is a hydrocarbonoxycarbonyl group in which the hydrocarbon moiety is a saturated alkyl group.

In addition to the particulate inorganic solid and the aromatic hydroxy compound, the composition of the present invention may include further components, in particular materials which are effective as processing aids. Such materials include the esters of polyols, particularly partially esterified polyols obtained by the esterification of a polyol with an acid especially an aliphatic acid containing at least eight, more preferably at least ten, carbon atoms such as octanoic, decanoic, dodecanoic, tetradecanoic and octadecanoic acid. The polyol can be an aliphatic compound containing at least two OH groups, for example glycerol, trimethylolpropane and pentaerythritol or may be sorbitan. All of the OH groups may be esterified but we prefer to use compounds in which at least one OH group is not esterified, for example a material which is a mixture of predominantly glycerol monoester, particularly with a commercially available long chain fatty acid mixture comprising mainly $C_{16}$ to $C_{18}$ acids.

It should be appreciated that some of the materials which can be used to obtain the compositions of the present invention may be obtained as mixtures and such mixtures are referred to herein by reference to the predominant component, or components, of the mixture.

As is discussed in more detail hereafter, the compositions of the present invention may be incorporated into a polymeric material. The compositions which are incorporated into a polymeric material may be obtained by mixing the particulate inorganic solid and the aromatic hydroxy compound with the polymeric material using any known blending technique, for example using a solids blending technique such as a tumble blender or a high speed mixer, or using a melt mixing technique such as a two roll mill, an internal mixer such as a Banbury or Brabender mixer or by using a compounding extruder. The particulate inorganic solid and the aromatic hydroxy compound may be added to the polymeric material in any order. Thus, the particulate inorganic solid may be added to the polymeric material and the aromatic hydroxy compound added subsequently or the reverse procedure may be used.

Preferably, the composition comprising the particulate inorganic solid and the aromatic hydroxy compound is pre-formed prior to being incorporated into a polymeric material, and it is especially preferred that the aromatic hydroxy compound is coated onto the particulate inorganic solid.

The composition may be prepared using any suitable technique and is preferably prepared using conditions under which the aromatic hydroxy compound is, at least partially, coated onto the surface of the particulate inorganic solid. The blending technique used is dependent on the particular aromatic hydroxy compound and especially the physical form thereof, which may be a solid or may be a liquid which may have a high viscosity.

Solid aromatic hydroxy compounds may be mixed with the particulate inorganic solid using a suitable solids blending technique, conveniently using a high speed mixer, which may be heated. Alternatively, the aromatic hydroxy compound in liquid form or in solution emulsion or dispersion is added to the solid, preferably by adding the liquid to the stirred solid. If the aromatic hydroxy compound is a viscous liquid, this may be diluted with a compatible liquid medium which is not reactive with the aromatic hydroxy compound or may be heated to a temperature at which the viscosity is sufficiently lowered for the liquid to be readily handled. If the aromatic hydroxy compound is added as a solution or a diluted mixture with another liquid, the liquid is preferably one which is more volatile than the aromatic hydroxy compound and especially has a boiling point of not more than 100° C. Materials which may be used as a solvent or a compatible liquid medium include alkanols and polyols, especially those containing not more than four carbon atoms, for example ethanol, or a halogenated hydrocarbon liquid such as 1,1,1-trichloroethane. Any solvent or compatible liquid medium which is used in the addition of the aromatic hydroxy compound to the particulate inorganic solid is preferably removed from the composition produced, either by allowing the solvent or compatible liquid to evaporate, if sufficiently volatile, or by raising the temperature in the later stages of the mixing process to evaporate off the solvent or compatible liquid. A similar procedure may be used if the aromatic hydroxy compound is added as an emulsion or dispersion in a non-solvent liquid, for example as an aqueous emulsion or dispersion.

If the aromatic hydroxy compound is a solid having a relatively low melting point, for example not more than 150° C., the aromatic hydroxy compound and the particulate inorganic solid are initially mixed with both components in the solid state and mixing is continued while the temperature is raised to a temperature above the melting point of the aromatic hydroxy compound to promote at least a partial coating of the aromatic hydroxy compound onto the particulate inorganic solid.

The proportion of the aromatic hydroxy compound may be as much as 20% by weight of the particulate inorganic solid but in general lower proportions are sufficient. However, proportions of up to 20% by weight of the aromatic hydroxy compound may be present in a concentrated mixture which may be diluted for use by mixing with an appropriate quantity of the particulate inorganic solid which does not contain any of the aromatic hydroxy compound. The composition preferably contains at least 0.2%, and especially at least 0.5%, by weight, relative to the particulate inorganic solid, of the aromatic hydroxy compound. Preferred compositions contain not more than 10%, and especially not more than 5%, by weight of the aromatic hydroxy compound.

If the composition also includes a material which is effective as a processing aid, the proportion of this further material is typically in the range as disclosed herein for the aromatic hydroxy compound or mixture. The weight ratio of the aromatic hydroxy compound or mixture to the processing aid is conveniently in the range 20:1 to 1:10, especially 15:1 to 1:1 for example 10:1.

The composition of the present invention may be incorporated into a polymeric material, for example an olefin polymer or a polyamide. Preferred compositions may be incorporated into the polymer in an amount such that the polymer composition contains a high proportion of the particulate inorganic solid, for example at least 30% by weight, preferably at least 50% by weight, and especially about 70% or more by weight of the particulate inorganic solid. The polymer composition typically contains not more than 90%, particularly not more than 80%, by weight of the particulate inorganic solid.

The polymeric material is very conveniently an olefin polymer. The olefin polymer, which term is used herein to include both homopolymers and copolymers containing at least 50% by weight of one, or more, olefin monomers, is a polymer of an olefin monomer which typically contains not more than ten carbon atoms. Thus, the olefin polymer may be any ethylene homopolymer or copolymer, particularly high density polyethylene or linear low density polyethylene which is a copolymer of ethylene with a higher olefin monomer such as butene-1, hexene-1, octene-1 or 4-methylpentene-1. Other ethylene polymers are the copolymers of ethylene and a polymer monomer, for example an ethylene-vinyl acetate copolymer typically one containing 10 to 40% by weight of vinyl acetate. Alternatively, the olefin polymer may be a propylene homopolymer or copolymer, for example a random copolymer of propylene with up to 8% by weight, relative to the polymer, of ethylene, or a sequential polymer obtained by polymerising propylene in the essential absence of other monomers and thereafter copolymerising a mixture of ethylene and propylene to give a polymer containing from 5 up to 30% by weight of ethylene. It is particularly preferred that the olefin polymer is a propylene polymer.

The preferred polymer is one having a molecular weight which is appropriate for a material which can be used for the production of shaped articles by an injection moulding or extrusion process. Thus, suitable olefin polymers, especially ethylene or propylene, are those having a melt flow index, measured according to ASTM Test Method 1238-79 using a 2.16 kg weight at a temperature of 230° C., which is in the range from 0.5 up to 50, for example from 1.0 up to 30.

The incorporation of a high proportion of the particulate inorganic solid into the polymeric material will reduce the melt flow index and the polymer composition containing the particulate inorganic solid typically has a melt flow index, measured at 190° C. but otherwise under the conditions specified previously herein, of not more than 10 and typically at least 0.05. In general the polymer composition has a melt flow index of not more than 8.

A preferred polymer composition in accordance with the present invention comprises a propylene polymer, aluminium hydroxide or magnesium hydroxide and an aromatic hydroxy compound.

The preferred polymer compositiion is especially one containing at least 50%, and not more than 80%, by weight of the polymer composition of aluminium hydroxide or magnesium hydroxide and 0.5 up to 5% by weight, relative to the aluminium hydroxide or magnesium hydroxide, of an aromatic hydroxy compound of formula (I) wherein either X is a group OH or CH=NOH, Y is a hydrogen atom and R is a saturated alkyl group or X and Y are both OH groups and R is a hydrocarbonoxycarbonyl group in which the hydrocarbon moiety is a saturated alkyl group.

The preferred polymer composition has fire retardant properties and can be used in applications for which a material having fire retardant properties is desirable. Since, the polymer composition does not contain a halogen-containing monomer, it typically will evolve fumes of lower toxicity than are obtained from polymer compositions containing a halogen-containing monomer, for example a polyvinylchloride based material.

In addition to the polymer, particulate inorganic solid and aromatic hydroxy compound, the polymer composition which is a further aspect of the present invention typically includes at least one additive to at least partially inhibit the degradation of the polymer component, particularly the olefin polymer component, of the composition. These additives include, inter alia, antioxidants, light stabilisers and, if necessary, copper or metal deactivators. The proportion of each of such additives is typically less than 2% by weight based on the olefin polymer and in general does not exceed 1% by weight based on the olefin polymer. A wide range of additives which provide some inhibition of the degradation of olefin polymers are known and the skilled worker will be able to select appropriate additives in accordance with the particular olefin polymer and the conditions under which it is to be processed and used. Examples of additives which can be used include 1,1,3-tris(2-methyl-4-hydroxy-5-tertiarybutylphenyl)-butane in combination with dilaurylthiodipropionate;
polymerised 1,2-dihydro-2,2,4-trimethylquinoline;
2,6-di-tertiarybutyl-4-methylphenol;
4,4-thio-bis-(6-tertiarybutyl-4-methyl phenol);
oxalic acid bis (benzylidene hydrazide);
N,N'-bis (beta-3, 5-ditertiarybutyl-4-hydroxy phenylpropiono) hydrazide; and
pentaerythrityl tetrakis(beta-3,5-ditertiarybutyl-4-hydroxyphenylpropionate).

The polymeric compositions in accordance with the present invention may be formed into shaped articles by any suitable technique, particularly by injection moulding or, especially, by extrusion.

To improve the performance of some polymers, for example polyethylene and copolymers of ethylene and vinyl acetate, it may be desirable to cross-link the olefin polymer once the polymer composition has been formed into a shaped article.

Cross-linking of such olefin polymer components may be achieved using any of the known techniques such as free radical, especially peroxide; radiation; or silane cross-linking.

Preferred polymer compositions in accordance with the present invention may include additional polymeric materials to improve the properties of the composition, for example a rubber which improves the impact properties of the polymer composition. The rubber can be a thermoplastic rubber for example a tri-block copolymer having polystyrene end blocks and a rubbery poly(ethylene-butylene) middle block. If desired the rubber may be blended with an oil, for example an oil having a boiling range of above 200° C. which is a mixture of paraffins and naphthenes.

The polymer compositions of the present invention may be obtained by blending the polymer with a preformed mixture of the particulate inorganic solid and the aromatic hydroxy compound and also with any other components of the composition. Alternatively, the particulate inorganic solid and the aromatic hydroxy compound may be added separately to the polymer together with such other components as are desired. Other sequences of addition may be used, as desired, to obtain the polymer composition. The polymer compositions may be obtained using any suitable blending technique, particularly a melt mixing technique using, for example, a two roll mill or, preferably, an internal mixer such as a Banbury or Brabender mixer. The mixing may be effected using a compounding extruder which may be a single screw extruder or, preferably, a twin screw extruder.

The polymer composition may be formed directly into a shaped article but more conveniently is first formed into granules which are subsequently injection moulded or extruded to form the desired shaped article. The polymer composition can be used for coating electrical conductors or as fire retardant panels or as a floor covering.

Various aspects of the present invention are described hereafter in the following illustrative examples in which all proportions are by weight unless specified to the contrary.

EXAMPLES 1 TO 11

A. Polymer Premix

A thermoplastic rubber (a tri-block copolymer having polystyrene end blocks and a rubbery (ethylenebutylene) middle block available from Shell Chemicals as Kraton G 1652, 40 parts) was mixed in a beaker with a hydrocarbon oil (a mixture of paraffins and napathenes available as Plastic Oil 260 from Witco BV, 40 parts) and pentaerythrityl tetrakis (beta-3,5-ditertiarybutyl-4-hydroxyphenylpropionate) (an antioxidant available from Ciba-Giegy as Irganox 1010, 4 parts). The mixture was allowed to stand overnight to allow the oil to soak into the rubber. The mixture was then melt-processed using a Farrell-Bridge 2-roll mill with the rollers heated by oil circulation at 200° C. (front) and 140° C. (rear). When the mixture was molten on the rollers, polypropylene (grade Moplen Z30S ex Himont, 400 parts) was added in portions to melt and form a viscous, molten band around the rollers. This band was scraped off the rollers, folded and put back between the nip of the rollers to form a fresh band. This operation was repeated 6 times over a period of 15–25 minutes to thoroughly mix the components and the material was then scraped off the rollers, cut into pieces and, when cold, was granulated using a simple mechanical granulator. The product (450 parts) was finally mixed by hand, tumble-blending in a plastic bag to give a uniform mix.

B Powder Mix

Alumina trihydrate (ATH, Grade SF-7 ex BA Chemicals PLC, 19.30 parts), polymer premix obtained described in Section A, 8.00 parts) and an aromatic hydroxy compound (AHC) (0.28 parts) were weighed into the grinding bowl of a coffee mill and mixed thoroughly for one minute, to give a physical distribution of the components.

The composition of the mixture formed was:

| | |
|---|---|
| Alumina trihydrate | 70.0% by weight |
| Polypropylene | 24.0% by weight |
| Rubber | 2.4% by weight |
| Plastic Oil | 2.4% by weight |
| AHC | 1.0% by weight |
| Antioxidant | 0.2% by weight. |

The mixture was emptied from the coffee-mill ready for transfer to the next stage.

C. Brabender Mixing

A Brabender Plastograph Type PL3S (ex Brabender Duisberg, W. Germany was set up for use fitted with a roller mixing head type W30H, and with a circulation of heat transfer oil to the jackets on the head. The temperature of the oil reservoir was set at 210° C.

The speed of rotation of the mixer was adjusted to 20 rpm. A Brabender "quick-charge chute" was fitted and the powder mix obtained as described in section B was transferred into the chute and, using the ram and a 5 Kg weight, the powder mix was pushed into the mixing head of the Brabender. The torque on the Brabender motor was recorded continuously giving a measure of the viscosity of the contents of the mixing chamber, whilst the temperature of the melt was measured by a fixed thermocouple and recorded at intervals. The recorded torque on the motor increased rapidly as the dry powders were added, and then fell as the polymers melted and a "putty" was formed. In a typical experiment, the torque was recorded at 20 rpm shear rate for 20 minutes, then the shear rate was increased to 40 rpm and the torque allowed to stabilise. Further stepwise increases to 120 rpm were carried out, and finally the shear rate was returned to 20 rpm. The melt temperature was recorded at intervals.

Finally the contents of the mixing head, a thick putty-like material, were scraped out whilst still hot.

The results obtained are set out in Table One in which the torque after mixing for 3 minutes and 20 minutes is recorded.

D Product Evaluation

The hard rock-like lumps obtained from the Brabender were broken up between sheets of paper using a hammer, then ground to a sandy material in a coffee-mill. The melt flow index of each product was measured using a Davenport instrument according to the methods described in ASTM Standard 1238-79 at a standard temperature of 190° C. and using a standard 2.16 Kg weight. Results are set out in Table One.

TABLE ONE

| Ex or Comp. Ex | AHC (a) | Torque (m.g.) (b) 3 min | 20 min | MFI g in 10 min (c) |
|---|---|---|---|---|
| A | NIL | 4400 | 3500 | 0.0 |
| B | SiATH | 1100 | 800 | 2.0 |
| C | DOCP | 4100 | 4200 | ND |
| D | NP | 3200 | 2100 | ND |
| 1 | TDDHB | 1200 | 1100 | 6.2 |
| 2 | ODDHB | 1200 | 1050 | 5.9 |
| 3 | HNBA | 2300 | 1650 | ND |
| 4 | HNBAO | 1000 | 700 | ND |
| E | THBA | 4800 | 3800 | ND |
| 5 | THBAAE | 1500 | 1600 | ND |
| 6 | THBAOE | 800 | 600 | 3.5 |
| 7 | THBAOE* | 1550 | 1400 | 0.1 |
| 8 | THBADDE | 1800 | 1200 | 4.7 |
| 9 | THBAODE | 1400 | 1100 | 3.1 |
| 10 | BHMHPP | 1000 | 950 | 0.2 |

TABLE ONE-continued

| Ex or Comp. Ex | AHC (a) | Torque (m.g.) (b) 3 min | 20 min | MFI g in 10 min (c) |
|---|---|---|---|---|
| 11 | OHMHPP | 1400 | 1400 | 0.7 |

Notes to Table One
(a) AHC is aromatic hydroxy compound.
SiATH is a silane coated alumina trihydrate available from BA Chemicals PLC as ATH (alumina trihydrate) grade SF7-S21.
DOCP is 4-dodecyloxycarbonylphenol
NP is 4-(mixed branched)nonylphenol
TDDHB is 1,2-dihydroxy-4-tetradecylbenzene
ODDHB is 1,2-dihydroxy-4-octadecylbenzene
HNBA is 2-hydroxy-5-(mixed branched)nonylbenzaldehyde
NHBAO is 2-hydroxy-5-(mixed branched)nonylbenzaldoxime
THBA is 3,4,5-trihydroxybenzoic acid
THBAAE is 3,4,5-trihyroxybenzoic acid allyl ester
THBAOE is 3,4,5-trihyroxybenzoic acid octyl ester
THBADDE is 3,4,5-trihydroxybenzoic acid dodecyl ester
THBAODE is 3,4,5-trihydroxybenzoic acid octadecyl ester.
BHMHPP is 2,2-bis(2-hydroxy-3-hydroxymethyl-5-t-butylphenyl)propane
OHMHPP is 2,2-bis(2-hydroxy-3-hydroxymethyl-5-octylphenyl)propane.
*in the preparation of the powder mix (section B) only 0.19 g of THBAOE was used.
(b) Torque is in m.g. as recorded by the Brabender Plastograph.
(c) MFI is melt flow index determined in accordance with ASTM Test Method 1238-79 at a temperature of 190° C. using a 2.16 kg weight.
ND means not determined.

EXAMPLES 12 TO 15

Pre-mixes were prepared of alumina trihydrate with an aromatic hydroxy compound (AHC) at 10% by weight relative to the alumina trihydrate by high speed blending in a Henschel mixer. Three types of operation were involved depending on the physical nature of the AHC.

A Powder Mix

Alumina trihydrate (ATH, SF7 grade ex BA Chemicals 1250 parts) and 3,4,5-trihydroxbenzoic acid octyl ester—THBAOE (140 parts) were charged to a Henschel mixer and the stirrer was started at 1300 rpm. Mixing was continued for 15 minutes, the temperature rising by frictional heating from 19° C. to 27° C. The stirrer was stopped and the mixture of dry powders was discharged.

B Liquid Addition

Alumina trihydrate (ATH, SF7 ex BA Chemicals, 1250 parts) was charged to a Henschel mixer and the stirrer was started at 1300 rpm. 2,2-bis(2-hydroxy-3-hydroxymethyl-5-t-butylphenyl)propane-BHMHPP—a mobile liquid (140 parts) was added to the Henschel mixer through a vent in the lid, as a thin stream over half an hour, the temperature rising from 27° to 32° C. To aid dispersion of the liquid over the surface of the alumina trihydrate, stirring was continued for a further 15 minutes then the product was discharged.

C Solvent Dilution

Alumina trihydrate (ATH, SF7 grade ex BA Chemicals, 1250 parts) was charged to a Henschel mixer and the stirrer was started at 1300 rpm. 2-hydroxy-5-(mixed branched) nonylbenzaldoxime-HNBAO—a very viscous liquid (140 parts) was mixed with ethanol (50 parts) to give a mobile solution, which was added to the Henschel mixer over 30 minutes, the temperature rising from 28° to 35° C. by frictional heating. Further ethanol (30 parts) was used to wash through the apparatus, into the Henschel mixer. After stirring for 15 minutes, the contents of the mixer were discharged to a container and the solvent was allowed to evaporate.

D Evaluation of ATH Premixes

A sample of the ATH premix (3.08 parts) obtained as described in Section A, B or C, was weighed into a coffee mill with further alumina trihydrate (ATH SF7 grade, 16.5 parts), polypropylene (Himont grade Z30S, 6.62 parts) and a mixture of Kraton G1651 (0.66 parts), Witco Plastic oil 260 (0.66 parts) and Irganox 1010 (0.016 parts). The mixture was blended in the coffee mill, charged to the Brabender and blended as described in Examples 1 to 11, Section C.

The resulting mixture had the composition:

| | |
|---|---|
| Aluminium hydroxide | 70.0% |
| Polypropylene | 24.0% |
| Kraton G1651* | 2.4% |
| Plasticising Oil | 2.4% |
| AHC | 1.1% |
| Antioxidant | 0.06% |

*Kraton G1651 is a thermoplastic rubber of the same general type as the Kraton 1652 which is used in Examples 1 to 11.

The results obtained are set out in Table Two.

E Twin-Screw Extrusion

E1 Premix Preparation

Each ATH premix prepared as described in section A, B or C, was tumble blended in a large plastic bag with further alumina trihydrate, polypropylene and with a rubber/oil/antioxidant premix, to give a dry blend to be fed to a twin-screw extruder.

The rubber/oil/antioxidant premix had been prepared beforehand to allow the oil to soak into the rubber by mixing in portions in a Henschel mixer, at ambient temperature for ten minutes. This premix had the composition

| | | |
|---|---|---|
| Kraton G1651 (Shell) | 2400 parts | 49.38% |
| Plastic Oil 260 (Witco) | 2400 parts | 49.38% |
| Irganox 1010 (Ciba-Geigy) | 60 parts | 1.23% |

The overall composition of the powder mix to be fed to a twin screw extruder was

| | |
|---|---|
| Alumina trihydrate/AHC Premix | 1100 parts |
| Alumina trihydrate | 6000 parts |
| Rubber Premix | 486 parts |
| Polypropylene | 2414 parts |
| | 10000 parts |

This powder mix had the composition

| | |
|---|---|
| Alumina trihydrate | 69.9% |
| Polypropylene | 24.14% |
| Kraton G1652 | 2.4% |
| Plastic Oil 260 | 2.4% |
| AHC | 1.1% |
| Antioxidant | 0.06% |

E2 Extrusion

An APV 2030 twin-screw extruder (APV Chemical Machinery Co. Ltd., Cooper Street, Hanley, Stoke-on-Trent) was used with the heating zones of the extruder maintained at the following temperatures.

| | | |
|---|---|---|
| Heater Zone | B1 | 97° C. |
| | B2 | 168° C. |
| | B3 | 170° C. |
| | B4 | 165° C. |
| | B5 | 164° C. |
| Die Heater | D1 | 170° C. |

The dry powder mix described in Section E1 was fed continuously via a hopper feeder, to "Starve-feed" the extruder, and the molten compound was extruded from the die (3.5 mm diameter) as a lace which was cooled in a water trough and chopped in a granulator.

The general ease of processing is summarised in Table Two.

The melt flow index of each of the products obtained was determined and is also set out in Table Two.

TABLE TWO

| | | Pre-Mix with ATH | | Twin-Screw Extrusion | Product | |
|---|---|---|---|---|---|---|
| | | | Torque (m.g) (b) | | Appearance | |
| Ex Comp Ex | AHC (a) (d) | Type (e) | 3 min | 20 min | General Ease (f) | (h) | MFI (c) |
| 12 | THBAOE | P | 1050 | 700 | Moderate | SG | 3.0 |
| | | | | | +0.15% Ca St Mod to good | SG | ND |
| 13 | BHMHPP | L | 1550 | 1200 | Very poor. Votatiles caused foaming | NIL | ND |
| 14 | HNBAO | S | 1350 | 950 | Very good | SY | 3.1 |
| 15 | THBAOE + GMS | P | ND | ND | Very good | CW | 4.9 |
| F | SiATH | NIL | ND | ND | Moderate | CW | ND |
| | | | | | +0.15% Ca St Better | CW | 4.1 |

Notes to Table Two
(a), (b) and (c) are all as defined in Notes to Table One.
(d) THBAOE + GMS is a 1:1 by weight mixture of THBAOE and a mixture of glycerol esters (predominantly monoesters) with a commercially available long chain fatty acid mixture comprising mainly $C_{16}$ to $C_{18}$ acids (referred to for convenience as glycerol monostearate).
(e) P is a premix prepared by powder mixing as in section A
L is a premix prepared by liquid addition as in section B
S is a premix prepared by solvent dilution as in section C.
(f) These comments indicate the general ease of processing using the extruder. +0.15% CaSt indicates that calcium carboxylate (carboxylate group derived from a commercially available long chain fatty acid mixture comprising mainly $C_{16}$ to $C_{18}$ acids) was additionally added to the mix in an amount of 0.15% wt relative to the total mixture.
(h) SG indicates a slight grey colour
NIL indicates no product was obtained
SY indicates a slight yellow colour
CW indicates the product was creamy white.

F Injection Moulding

The products obtained as described in section E2 were melt-processed using a BOY injection moulder to provide three types of moulded sample for physical testing:

1. Tensile bars, dumbbell-shaped strips 114×7 mm (at narrow section)×1.6 mm.
2. Notched IZOD bars, 63×13×3.2 mm with a standard notch moulded along one side.
3. Discs 89 mm diameter×1.7 mm thickness.

The moulded samples were subjected to the following tests:-

F1 Fire Test

Injection moulded discs were cut to provide strips of dimensions 85 mm (approx)×12.5 mm×1.7 mm. These were used in the Underwriters Laboratories UL94 test.

All of the materials tested were found to meet the requirement of the V/O classification of this test.

F2 Tensile Tests

The tensile properties of the "tensile bars" were measured using a Testometric Micro 350 (Testometric Co. Ltd., Rochdale) by the methods described in ASTM Specification D638-82, at a cross-head speed of 2 mm/min. The results are tabulated in Table Three.

TABLE THREE

| AHC (a) (d) (j) | Tensile Str. at break (MPa) | Elongation at break % |
|---|---|---|
| THBAOE | 18.7 | 9.7 |
| THBAOE + GMS | 18.8 | 8.0 |
| SiATH + Ca St | 26.4 | 18.4 |

Notes to Table Three
(a) is as defined in Notes to Table One.
(d) is as defined in Notes to Table Two.
(j) SiATH + Ca St indicates the use of a silane coated alumina trihydrate, with the addition of calcium carboxylate (derived from a commercially available long chain fatty acid mixture comprising mainly $C_{16}$ to $C_{18}$ acids) added to the mix for extrusion in an amount of 0.15% wt relative to the total mixture.

EXAMPLE 16

A. Preparation of pre-mix with alumina trihydrate

Alumina trihydrate (1250 parts of ATH SF7 grade) was stirred in a Henschel mixer and a solution of THBAOE (19.1 parts) in ethanol (50 cm³) was added over 15 mins at 20°–25° C. The mixture was stirred for ten minutes without applying external heating and stirring was then continued whilst steam was applied to the jacket of the mixer to raise the temperature to 130° C. over a period of 45 minutes. Stirring at 130° C. was continued for 50 minutes and the mixture was then cooled for discharge.

B Evaluation of ATH Pre mixture

An ATH pre-mixture (19.58 parts) obtained as described in Section A was blended with a polypropylene/rubber premix (8.00 parts) to give the same ratios of materials as in Examples 12 to 15.

The resulting mixture was processed using a Brabender mixer as described in Examples 1 to 11, Section C. The results are given in Table Four.

C Rubber Premix

A rubber premix was prepared as described in Examples 12 to 15, section E1 to give a composition of:

| | | |
|---|---|---|
| Kraton G1651 (Shell) | 4243 parts | 66.01% |
| Witco Plastic Oil 260 | 2131 parts | 33.15% |
| Irganox 1010 (Ciba-Geigy) | 53.6 parts | 0.84% |

These materials were mixed and allowed to stand a few days to allow the oil to soak into the rubber.

D Blend for Extrusion

A blend of ingredients was made by tumble-blending components and premixtures in the following proportions.

| | |
|---|---|
| Pre-mix of section A | 2300 parts |
| Rubber pre-mix of section C | 235 parts |
| Polypropylene (HIMONT Z30S) | 703 parts |

The resulting blend had the following composition:

| | |
|---|---|
| Alumina trihydrate | 69.97% |
| Polypropylene | 21.71% |
| Kraton G1651 | 4.79% |
| Witco Oil | 2.41% |
| THBAOE | 1.06% |
| Antioxidant | 0.06% |

E Extrusion

The procedure of Examples 12 to 15, section E2 was repeated with the exception that the temperatures used were as follows:

| | | |
|---|---|---|
| Heater Zone | B1 | 175 |
| | B2 | 180 |
| | B3 | 185 |
| | B4 | 185 |
| | B5 | 165 |
| Die Zone | D1 | 185 |

The die used had 4 holes each of 5 mm diameter. The torque and die pressure were recorded. The melt flow index of the resulting mixture was measured. The results obtained are set out in Table Four.

F Injection Moulding

The products obtained as described in Section E were melt processed using a BOY injection moulder, as described in Section F of Examples 12 to 15. The moulded samples were subjected to the following tests:

F1 Fire Test

Notched Izod bars were used in the Underwriters Laboratories UL94 test. Additionally, strips were cut from injection moulded discs to the dimensions 85 mm (approx) × 12.5 mm × 1.7 mm. These strips were used in the same test.

The material of Example 16 was found to meet the requirements of the V/O classification of this test.

F2 Tensile Tests

The tensile properties of the "tensile bars" were measured as described in Section F2 of Examples 12 to 15. The results are displayed in Table Four.

TABLE FOUR

| AHC (a) (k) | Tensile Strength at break (MPa) | Elongation at Break (%) |
|---|---|---|
| THBAOE | 17.0 | 9.0 |
| SiATH + Ca St | 22.7 | 12.5 |

Notes to Table Four
(a) is as defined in Notes to Table One.
(k) indicates that the products obtained by extrusion using silane coated alumina trihydrate, and using silane coated alumina trihydrate with calcium carboxylate (as defined) were mixed in a ratio of equal parts by weight, prior to injection moulding.

EXAMPLES 17 AND 18

A Polymer Premix

A premix was prepared as described in Section A of Examples 1 to 12.

B Powder Mix

B1 Pre-coated Alumina Trihydrate

Alumina trihydrate (25.0 parts, SF7 grade ex BA Chemicals) and ethanol 740P (100 ml) were stirred at laboratory temperature. To this suspension was added 0.375 parts of a solid which was the product of a reaction of pyrogallol with an alkyl aldehyde containing 10 carbon atoms, shown to have a structure having a "great ring" of four linked benzene rings, as described in Example 11 of published European Patent Application EP 0400773.

The mixture was stirred at laboratory temperature for 30 minutes and then the solvent was removed by distillation under reduced pressure using a rotary evaporator with a water bath temperature up to 80° C. The residue in the evaporator flask, alumina trihydrate combined with the pyrogallol derivative, was scraped out and further dried in a vacuum oven at room temperature, and with maximum reduced pressure obtained by use of a water pump.

TABLE FOUR

| Ex or Comp Ex | AHC (a) | Pre-mix with ATH Brabender Torque (m.g) (b) | | Twin-Screw Extension | | | Product | |
|---|---|---|---|---|---|---|---|---|
| | | 3 min | 20 min | General Ease (f) | Torque (%) | Die Pressure (Bar) | Appearance (h) | MFI (c) |
| 16 | THBAOE | 730 | 550 | Very good | 25 | 20 | SG | 0.7 |
| G | SiATH | 820 | 610 | Quite good +0.15% Ca St: Good | ND 45-50 | ND 10 | CW CW | 1.1 0.4 |
| H | NIL | 3200 | 3300 | 0.15% Ca St: Very poor. Die press v.high | 40+ | rising to 150 stopped | CW | 0.0 |

Notes to Table Four
(a), (b) and (c) are all as defined in Notes to Table One.
(f) and (h) are both defined in Notes to Table Two.

B2 Mix with Polymer Premix

The pre-coated alumina trihydrate from Section B1 (19.58 parts) was mixed with Polymer Premix from Section B (8.0 parts) and was milled for 1 minute in the mixing bowl of a coffee mill.

The composition of the mixture was

| | |
|---|---|
| Alumina trihydrate | 70.0% by weight |
| Polypropylene | 24.0% by weight |
| Rubber | 2.4% by weight |
| Plastic Oil | 2.4% by weight |
| AHC | 1.0% by weight |
| Antioxidant | 0.2% by weight |

The mixture was emptied from the coffee-mill ready for transfer to the next stage.

C Brabender Mixing

The powder mix from Section B was processed in the Brabender Plastograph as described in Section C of Examples 1 to 12.

The results obtained are set out in Table Five in which the torque after mixing for 3 minutes and 20 minutes is recorded.

D Product Evaluation

The hard rock-like lumps obtained from the Brabender were broken up between sheets of paper using a hammer, then ground to a sandy material in a coffee-mill. The melt flow index of each product was measured using a Davenport instrument according to the methods described in ASTM Standard 1238-79 at a standard temperature of 190° C. and using a standard 2.16 Kg weight. Results are set out in Table Five.

TABLE FIVE

| EX | AHC (a) | Torque (mg) (b) 3 min | 20 min | MFI (c) g in 10 min |
|---|---|---|---|---|
| 17 | PD | 1600 | 800 | 3.5 |
| 18 | RD | 2000 | 900 | 2.8 |

Notes to Table Five
(a) AHC is aromatic hydroxy compound
PD is the pyrogallol derivative described in Example 17, Section B1
RD is a resorcinol derivative prepared from resorcinol and a tetradecyl aldehyde ($C_{13}H_{27}CHO$) essentially by the method described in J.Am.Chem.Soc. (1988) Vol 110, at page 634.

We claim:

1. A composition comprising a particulate inorganic solid and 0.1 up to 20% by weight, relative to the particulate inorganic solid, of an aromatic hydroxy compound of the general formula (I) or of the general formula (II) or of the general formula (III)

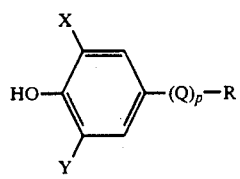

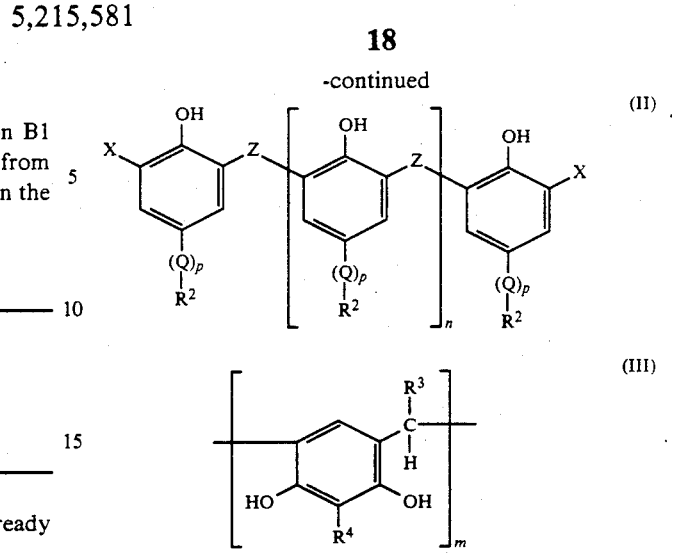

wherein
X is a group OH, $CR^1O$, $CR^1=NOH$ or AOH;
Y is a hydrogen atom or is as defined for the group X;
Q is —O—, —CO—, —CO.O— or —O.CO—;
P is zero or 1;
R is a saturated hydrocarbon which contains at least eight carbon atoms or an unsaturated hydrocarbon which contains at least three carbon atoms and the hydrocarbon moiety is optionally substituted;
$R^1$ is a hydrogen atom or a hydrocarbon group or a substituted hydrocarbon group;
$R^2$ is hydrogen when p is zero, or a hydrocarbon group or substituted hydrocarbon group;
$R^3$ is a hydrocarbyl group or a substituted hydrocarbyl group which contains from 1 up to 24 carbon atoms;
$R^4$ is hydrogen or a hydroxy group;
A is a divalent linking group which is a hydrocarbon or substituted hydrocarbon group;
Z is a direct bond or a divalent linking group;
m is an integer; and
n is zero or has a positive value.

2. A composition as claimed in claim 1 wherein in the compound of formula (I), X is OH or $CR^1=NOH$, and Y is hydrogen or OH.

3. A composition as claimed in claim 1 wherein R is a tetradecyl, octadecyl, mixed branched chain nonyl, mixed branched chain dodecyl, allyloxycarbonyl, octyloxycarbonyl, dodecyloxycarbonyl or octadecyloxycarbonyl group.

4. A composition as claimed in claim 1 wherein in the compound of formula (II) the group X is a group AOH.

5. A composition as claimed in claim 4 wherein $R^2$ is a hydrocarbon group which contains at least four carbon atoms and not more than 20 carbon atoms.

6. A composition as claimed in claim 4 wherein the value of n is zero.

7. A composition as claimed in claim 1 wherein in the compound of formula (III) $R^3$ is alkyl or a substituted alkyl group.

8. A composition as claimed in claim 7 wherein $R^3$ is an unsubstituted alkyl group which contains at least 4 and not more than 14 carbon atoms.

9. A composition as claimed in claim 1 wherein m has a value of four.

10. A composition as claimed in claim 9 wherein the —OH groups on the benzene rings are all oriented in the same direction and lie on the same side of the molecule.

11. A composition as claimed in claim 1 wherein the particulate inorganic solid is a basic filler.

12. A composition as claimed in claim 11 wherein the particulate inorganic solid is a fire retardant material which liberates water on heating.

13. A composition as claimed in claim 12 wherein the particulate inorganic solid is hydrated alumina or magnesium hydroxide.

14. A composition as claimed in claim 1 wherein the particulate inorganic solid is a fire retardant material which liberates water on heating and the aromatic hydroxy compound is a compound of general formula (I) in which either X is a group OH or CH=NOH, Y is a hydrogen atom and R is a saturated alkyl group or X and Y are both OH groups and R is a hydrocarbonoxycarbonyl group in which the hydrocarbon moiety is a saturated alkyl group.

* * * * *